(12) United States Patent
Labarge et al.

(10) Patent No.: US 6,407,032 B1
(45) Date of Patent: Jun. 18, 2002

(54) POISON RESISTANT LEAN $NO_x$ CATALYST

(75) Inventors: William J. Labarge, Bay City; Mark David Hemingway, Columbiaville; Joachim Kupe, Davisburg; Galen Bruce Fisher, Bloomfield Hills, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/751,685

(22) Filed: Dec. 29, 2000

(51) Int. Cl.[7] .................................................. B01J 23/00
(52) U.S. Cl. ........................ 502/349; 502/340; 502/60
(58) Field of Search ................................ 502/208, 349, 502/344, 347, 350, 355, 337, 345, 325, 64, 79

(56) References Cited

U.S. PATENT DOCUMENTS

| 3,963,644 | A | * | 6/1976 | Hansford | ................ | 252/455 Z |
| 4,873,216 | A | * | 10/1989 | Absil | ........................ | 502/211 |
| 5,380,692 | A | * | 1/1995 | Nakatsuji et al. | ........... | 502/303 |
| 6,238,631 | B1 | * | 5/2001 | Ogata et al. | ............. | 422/186.3 |

FOREIGN PATENT DOCUMENTS

| JP | 7313882 | 12/1995 |
| JP | 8281116 | 10/1996 |

* cited by examiner

*Primary Examiner*—Steven P. Griffin
*Assistant Examiner*—Edward M. Johnson
(74) *Attorney, Agent, or Firm*—Vincent A. Cichosz

(57) ABSTRACT

A poison resistant lean $NO_x$ catalyst comprising: a protective coating of a first catalyst support material including a metal-zirconium phosphate component, coated on a second $NO_x$ occluding catalyst material.

15 Claims, No Drawings

POISON RESISTANT LEAN $NO_x$ CATALYST

BACKGROUND OF THE INVENTION

The present invention relates to a catalyst for purifying exhaust gases from an internal combustion engine. In particular, it relates to a lean $NO_x$ catalyst.

It is well known in the art to use catalyst compositions, including those commonly referred to as three-way conversion catalysts ("TWC catalysts") to treat the exhaust gases of internal combustion engines. Such catalysts, containing precious metals like platinum, palladium, and rhodium, have been found both to successfully promote the oxidation of unburned hydrocarbons (HC) and carbon monoxide (CO) and to promote the reduction of nitrogen oxides ($NO_x$) in exhaust gas, provided that the engine is operated around balanced stoichiometry for combustion ("combustion stoichiometry"; i.e., between about 14.7 and 14.4 air/fuel (A/F) ratio).

However, fuel economy and global carbon dioxide ($CO_2$) emissions have made it desirable to operate engines under lean-burn conditions, where the air-to-fuel ratio is somewhat greater than combustion stoichiometry to realize a benefit in fuel economy. Diesel and lean-burn gasoline engines generally operate under highly oxidizing conditions (i.e., using much more air than is necessary to burn the fuel), typically at air/fuel ratios greater than 14.7 and generally between 19 and 35. Under these highly lean conditions, typical three-way catalysts exhibit little activity toward $NO_x$ reduction, as their reduction activity is suppressed by the presence of excess oxygen.

The control of $NO_x$ emissions from vehicles is a worldwide environmental problem. Lean-burn, high air-to-fuel ratio, and diesel engines are certain to become more important in meeting the mandated fuel economy requirements of next-generation vehicles. Development of an effective and durable catalyst for controlling $NO_x$ emissions under net oxidizing conditions accordingly is critical.

Recently, copper-ion exchanged zeolite catalysts have been shown to be active for selective reduction of $NO_x$ by hydrocarbons in the presence of excess oxygen. Platinum-ion exchanged zeolite catalyst is also known to be active for $NO_x$ reduction by hydrocarbons under lean conditions. However, this catalytic activity is significant only in a narrow temperature range around the lightoff temperature of hydrocarbon oxidation. All the known lean-$NO_x$ cayalysts reported in the literature tend to lose their catalytic activity for $NO_x$ reduction when the catalyst temperature reaches well above the lightoff temperature of hydrocarbon oxidation. This narrow temperature window of the lean-$NO_x$ catalysts is considered to be one of the major technical obstacles, because it makes practical application of these catalysts difficult for lean-burn gasoline or diesel engines). As an example, the Cu-zeolite catalysts deactivate irreversibly if a certain temperature is exceeded. Catalyst deactivation is accelerated by the presence of water vapor in the stream and water vapor suppresses the NO reduction activity even at lower temperatures. Also, sulfate formation at active catalyst sites and on catalyst support materials causes deactivation. Practical lean-$NO_x$ catalysts must overcome all three problems simultaneously before they can be considered for commercial use. In the case of sulfur poisoning, some gasoline can contain up to 1200 ppm of organo-sulfur compounds. Lean-$NO_x$ catalysts promote the conversion of such compounds to $SO_2$ and $SO_3$ during combustion. Such $SO_2$ will adsorb onto the precious metal sites at temperatures below 300° C. and thereby inhibits the catalytic conversions of CO, $C_xH_y$(hydrocarbons) and $NO_x$. At higher temperatures with an $Al_2O_3$ catalyst carrier, $SO_2$ is converted to $SO_3$ to form a large-volume, low-density material, $Al_2(SO_4)_3$, that alters the catalyst surface area and leads to deactivation. In the prior art, the primary solution to this problem has been to use fuels with low sulfur contents.

Another alternative is to use catalysts that selectively reduce $NO_x$ in the presence of a co-reductant, e.g., selective catalytic reduction (SCR) using ammonia or urea as a co-reductant. Selective catalytic reduction is based on the reaction of NO with hydrocarbon species activated on the catalyst surface and the subsequent reduction of $NO_x$ to $N_2$. More than fifty such SCR catalysts are conventionally known to exist. These include a wide assortment of catalysts, some containing base metals or precious metals that provide high activity. Unfortunately, just solving the problem of catalyst activity in an oxygen-rich environment is not enough for practical applications. Like most heterogeneous catalytic processes, the SCR process is susceptible to chemical and/or thermal deactivation. Many lean-$NO_x$ catalysts are too susceptible to high temperatures, water vapor and sulfur poisoning (from $SO_x$).

Yet another viable alternative involves using co-existing hydrocarbons in the exhaust of mobile lean-burn gasoline engines as a co-reductant and is a more practical, cost-effective, and environmentally sound approach. The search for effective and durable non-selective catalytic reduction "NSCR" catalysts that work with hydrocarbon co-reductant in oxygen-rich environments is a high-priority issue in emissions control and the subject of intense investigations by automobile and catalyst companies, and universities, throughout the world.

A leading catalytic technology for removal of $NO_x$ from lean-burn engine exhausts involves $NO_x$ storage reduction catalysis, commonly called the "lean-$NO_x$ trap". The lean-NOtrap technology can involve the catalytic oxidation of NO to $NO_2$ by catalytic metal components effective for such oxidation, such as precious metals. However, in the lean $NO_x$ trap, the formation of $NO_2$ is followed by the formation of a nitrate when the $NO_2$ is adsorbed onto the catalyst surface. The $NO_2$ is thus "trapped", i.e., stored, on the catalyst surface in the nitrate form and subsequently decomposed by periodically operating the system under stoiciometrically fuel-rich combustion conditions that effect a reduction of the released $NO_x$ (nitrate) to $N_2$.

The lean-$NO_x$-trap technology has been limited to use for low sulfur fuels because catalysts that are active for converting NO to $NO_2$ are also active in converting $SO_2$ to $SO_3$. Lean $NO_x$ trap catalysts have shown serious deactivation in the presence of $SO_x$ because, under oxygen-rich conditions, $SO_x$ adsorbs more strongly on $NO_2$ adsorption sites than $NO_2$, and the adsorbed $SO_x$ does not desorb altogether even under fuel-rich conditions. Such presence of $SO_3$ leads to the formation of sulfuric acid and sulfates that increase the particulates in the exhaust and poison the active sites on the catalyst. Attempts with limited success to solve such a problem have encompassed the use of selective $SO_x$ adsorbents upstream of lean $NO_x$ trap adsorbents. Furthermore, catalytic oxidation of NO to $NO_2$ is limited in its temperature range. Oxidation of NO to $NO_2$ by a conventional Pt-based catalyst maximizes at about 250° C. and loses its efficiency below about 100 degrees and above about 400 degrees. Thus, the search continues in the development of systems that improve lean $NO_x$ trap technology with respect to temperature and sulfer considerations.

Another $NO_x$ removal technique comprises a non-thermal plasma gas treatment of NO to produce $NO_2$ which is then combined with catalytic storage reduction treatment, e.g., a lean $NO_x$ trap, to enhance $NO_x$ reduction in oxygen-rich vehicle engine exhausts. In the lean $NO_x$ trap, the $NO_2$ from the plasma treatment is adsorbed on a nitrate-forming material, such as an alkali material, and stored as a nitrate. An engine controller periodically runs a brief fuel-rich condition to provide hydrocarbons for a reaction that decomposes the stored nitrate into benign products such as $N_2$. By using a plasma, the lean $NO_x$ trap catalyst can be implemented with known $NO_x$ adsorbers, and the catalyst may contain less or essentially no precious metals, such as Pt, Pd and Rh, for reduction of the nitrate to $N_2$. Accordingly, an advantage is that a method for $NO_x$ emission reduction is provided that is inexpensive and reliable. The plasma-assisted lean $NO_x$ trap can allow the life of precious metal lean $NO_x$ trap catalysts to be extended for relatively inexpensive compliance to $NO_x$ emission reduction laws. Furthermore, not only does the plasma-assisted lean $NO_x$ trap process improve the activity, durability, and temperature window of lean $NO_x$ trap catalysts, but it allows the combustion of fuels containing relatively high sulfur contents with a concomitant reduction of $NO_x$, particularly in an oxygen-rich vehicular environment.

What is needed in the art is an exhaust gas catalyst system having improved durability, as well as effective $NO_x$ management, over extended operating time. The present invention overcomes many of the shortcomings of the prior art.

SUMMARY OF THE INVENTION

Now, according to the present invention, a lean $NO_x$ catalyst is provided for use in a non-thermal plasma assisted exhaust gas treatment system. The presently invented catalyst comprises a protective coating of phosphate catalyst support that features large pores and accordingly is resistant to plugging and thereby limiting diffusion to subsurface catalysts. The support includes a metal-zirconium phosphate component to prevent sulfates from penetrating and poisoning the subsurface catalyst. The catalyst support preferably comprises a barium zirconium phosphate, a cesium zirconium phosphate, and/or a silver zirconium phosphate. Support activity may be modified with addition of titanium, aluminum, silicon and/or yttrium, such that barium titanium zirconium phosphate, barium aluminum zirconium phosphate, barium silicon zirconium phosphate or barium yttrium zirconium phosphate may be used. In addition, active metals, such as nickel, copper, and/or cobalt may be incorporated into the support, such that barium nickel zirconium phosphate, barium copper zirconium phosphate or barium cobalt zirconium phosphate may be used.

The protective coating of metal phosphate, such as barium zirconium phosphate, may be applied over a coating of another $NO_x$ occluding catalyst, such as zeolites, aluminum oxides, titanium doped zeolites, and the like. $NO_x$ occluding catalysts including barium Y-zeolite, barium alumina, mixtures thereof, and the like are preferred.

A metal zirconium phosphate coating comprising about 10 wt % is preferred, about 20 wt % is more preferred, and about 30 wt % is particularly preferred. A preferred $NO_x$ catalyst according to the present invention comprises a monolith with about 3.0 g/in$^3$ of barium Y-zeolite, and then a top layer of about 1.0 g/in$^3$ barium zirconium phosphate.

The above-described and other features and advantages of the present invention will be appreciated and understood by those skilled in the art from the following detailed description and appended claims.

DESCRIPTION OF PREFERRED EMBODIMENTS

The "occluding" ($NO_x$ adsorbing) catalyst in diesel applications is typically barium-zeolite (active ~175–300° C.). In lean burn applications, the occluding catalyst typically is barium-alumina (active ~300–475° C.). However, a limitation of zeolites and aluminas is that their pore sizes are small (e.g., less than 6 nm(nanometers) and most often less than 2 nm). Also, the zeolites are very fine materials that pack tightly, thus making gas diffusion through a zeolite washcoat difficult.

Phosphate materials have high surface areas, similar to aluminas and zeolites. But, unlike aluminas and zeolites, phosphate materials have much larger pore sizes. The pore sizes of phosphates can be large enough that deposition of heavy organics do not greatly restrict gas diffusion to the subsurface catalyst areas. The phosphate supports have larger pore structures (e.g., up to 100 nm). Incorporating such coarse large pore materials as a catalyst support opens up the packing such that gas diffusion through the layer is much easier. Suitable large pore supports include barium zirconium phosphate, barium-titanium-zirconium phosphate and barium nickel-zirconium phosphate.

At the catalyst support surface (the portion of the support that exhaust gasses reach first), it has been determined that it is beneficial to avoid the use of dense-packed, smaller-pore alumina or silica-alumina (zeolite) support materials. According to the present invention, a surface of coarse (10 to 30 microns), larger-pore sized support material accommodates the scavenging of exhaust poisons without restricting diffusion to the catalyst subsurface. The preferred protective coating is barium zirconium phosphate. The surface chemistry of barium zirconium phosphate may be modified with titanium, aluminum, silicon or yttrium. An active metal such as nickel, cobalt or copper may also be included. The active subsurface catalyst may be an occluding material, such as barium, supported on additional metal phosphates.

Occluding ions can be ion exchanged onto the phosphate surface in the same manner as ion exchange onto a zeolite surface. For example, a typical zeolite formulation, as commercially obtained, typically has sodium on some of the silica alumina sites. When a zeolite material such as $Na—SiO_2/Al_2O_3$ is reacted with barium nitrate, the barium ions replace the sodium ions. Upon calcining, the product becomes $Ba—SiO_2/Al_2 O_3$. In the same manner, using phosphates such as $Na—Zr_2 P_3O_{12}$, the sodium can be ion exchanged with barium nitrate attaching barium at the sodium sites to produce $Ba—Zr_4P_6O_{24}$. Typical supported alkaline earths include $BaZr_4P_6O_{24}$, $Sr—Zr_4P_6O_{24}$, $Cs—Zr_4P_6O_{24}$, and $Ca—Zr_4P_6O_{24}$.

Pure barium zirconium phosphate, $BaZr_4P_6O_{24}$, contains 12.8 wt % barium. However, similar to adsorption on zeolites, barium can be adsorbed not only on the sodium sites, but also on the zirconium sites, and even as free barium oxide in the pores. The zirconium phosphate support can contain over 30 wt % barium. The preferred loading of barium is about 13 wt % to about 24 wt % is more preferred, and about 18 wt % is particularly preferred.

Further, the support material does not necessarily have to be pure barium zirconium phosphate. The zirconium phosphate may be modified with elements such as titanium, silicon, aluminum, or yttrium. Silicon substituted for phosphorus creates a deficient charge creating more anionic sites for barium. Yttrium substitution for zirconium creates a deficient charge creating more anionic sites for barium. A content of about 3 moles titanium, silicon, aluminum or yttrium to about 1 mole zirconium is preferred; about 2 moles titanium, silicon, aluminum or yttrium to about 2 moles zirconium is more preferred; and, about 1 mole titanium, silicon, aluminum or yttrium to about 3 moles zirconium is particularly preferred.

Additionally, a group VIII metal such as nickel, cobalt, or copper also may be incorporated in the support, forming, for example, barium nickel zirconium phosphate. A content of about 3 moles metal to about 1 mole zirconium is preferred; about 2 moles metal to about 2 moles zirconium is more preferred; and, about 1 mole metal to about 3 moles zirconium is particularly preferred.

In preparing the ion exchanged phosphate catalyst support coating material of the present invention, barium sources generally include barium nitrate, barium acetate, barium hydroxide, barium ethoxide, barium isopropoxide, barium 2-ethylhexanoate. Barium acetate, barium isopropoxide, and barium nitrate are preferred; barium isopropoxide and barium nitrate are more preferred; and barium nitrate is particularly preferred.

Suitable zirconium sources generally include zirconium dioxide, zirconium oxychloride, zirconium tert-butoxide, zirconium ethoxide, zirconium isopropoxide, colloidal zirconium oxide. Colloidal zirconium oxide, zirconium isopropoxide, and zirconium oxychloride are preferred; zirconium isopropoxide and zirconium oxychloride are more preferred; and zirconium oxychloride is particularly preferred.

Suitable phosphate sources generally include phosphoric acid, ammonium dihydrogen phosphate, diammonium hydrogen phosphate, triammonium phosphate, ammonium phosphate. Triammonium phosphate, diammonium hydrogen phosphate, and ammonium dihydrogen phosphate are preferred; diammonium hydrogen phosphate and ammonium dihydrogen phosphate are more preferred; and ammonium dihydrogen phosphate is particularly preferred.

Suitable titanium sources generally include titanium dioxide, titanium oxychloride, titanium oxynitrate, titanium isobutoxide, titanium n-butoxide, titanium tert-butoxide, titanium ethoxide, titanium isopropoxide, titanium methoxide, titanium n-propoxide, colloidal titanium oxide. Titanium oxynitrate, titanium isopropoxide, and titanium oxychloride are preferred; titanium isopropoxide and titanium oxychloride are more preferred; and titanium oxychloride is particularly preferred.

Suitable aluminum sources generally include aluminum oxide, aluminum hydroxide, aluminum methoxide, aluminum n-butoxide, aluminum ethoxide and aluminum isopropoxide. Aluminum ethoxide, aluminum isopropoxide, and aluminum hydroxide are preferred; aluminum isopropoxide and aluminum hydroxide are more preferred; and aluminum hydroxide is particularly preferred.

Suitable silicon sources generally include silicon oxide, colloidal silicon oxide, aminopropylsilanetriol, N-propyltrimethoxysilane, chloropropyltrimethoxysilane, isobutyltriethoxysilane, tetraethoxysilane, ureidopropyltriethoxysilane, and vinyltrimethoxysilane. Aminopropylsilanetriol, N-propyltrimethoxysilane, and isobutyltriethoxysilane are preferred; N-propyltrimethoxysilane and isobutyltriethoxysilane are more preferred; and isobutyltriethoxysilane is particularly preferred.

Suitable yttrium sources generally include yttrium oxide, colloidal yttrium oxide, yttrium isopropoxide, yttrium 2-ethylhexanoate. Yttrium 2-ethylhexanote, colloidal yttrium oxide, and yttrium isopropoxide are preferred; colloidal yttrium oxide and yttrium isopropoxide are more preferred; and yttrium isopropoxide is particularly preferred.

Suitable nickel sources generally include nickel oxide, nickel nitrate, nickel acetate, nickel hydroxide, nickel carbonate, nickel stearate and nickel phosphate. Nickel nitrate, nickel hydroxide, and nickel acetate are preferred; nickel hydroxide and nickel acetate are more preferred; and nickel acetate is particularly preferred.

Suitable cobalt sources generally include cobalt oxide, cobalt nitrate, cobalt hydroxide, cobalt acetate, cobalt carbonate, cobalt stearate, cobalt ammonium phosphate and cobalt phosphate. Cobalt nitrate, cobalt hydroxide, and cobalt acetate are preferred; cobalt hydroxide and cobalt acetate are more preferred; and, cobalt acetate is particularly preferred.

Suitable copper sources generally include copper oxide, copper nitrate, copper acetate, copper carbonate, copper hydroxide, copper oxylate and copper phosphate. Copper nitrate, copper hydroxide, and copper acetate are preferred; copper hydroxide and copper acetate are more preferred; and, copper acetate is particularly preferred.

The following examples are provided to further describe the invention. The examples are intended to be illustrative in nature and are not to be construed as limiting the scope of the invention.

EXAMPLE 1

1 mole barium nitrate, 4 moles zirconium oxychloride and 6 moles ammonium dihydrogen phosphate are mixed together. The mixture is allowed to set 24 hours. The mixture is filtered, washed, dried at 80° C. then calcined to 500° C. The resulting product is ball milled and screened to less than 10 microns.

Y-Zeolite with a silica to alumina ratio of 5, is mixed with a saturated barium-nitrate solution and heated to 80° C. for 4 hours. The solids are filtered then washed then calcined at 740° C. for 2 hours. The process is repeated at least 2 more times. The resulting material has barium occupying sites that had contained sodium. At least 18 wt % barium and up to 28 wt % barium is incorporated into the zeolite structure.

700 grams barium Y-zeolite is mixed with 300 grams barium zirconium phosphate, 30 grams ammonium dihydrogen phosphate and 1300 grams water. The slurry is coated on a 600 cell/in$^3$ cordierite monolith and calcined to 500° C. for 4 hours. The calcined washcoat weight is targeted to 4.0 g/in$^3$.

EXAMPLE 2

Y-Zeolite with a silica to alumina ratio of 5, is mixed with a saturated barium-nitrate solution and heated to 80° C. for 4 hours. The solids are filtered then washed then calcined at 740° C. for 2 hours. The process is repeated at least 2 more times. The resulting material has barium occupying sites that had contained sodium. At least 18 wt % barium and up to 28 wt % barium is incorporated into the zeolite structure. The slurry is coated on a 600 cell/in$^3$ cordierite monolith and calcined to 500° C. for 4 hours. The calcined washcoat weight is targeted to 3.0 g/in$^3$.

1000 grams barium zirconium phosphate is mixed with 30 grams ammonium dihydrogen phosphate and 1300 grams water. The slurry is coated over a monolith previously coated with 3.0 g/in$^3$ barium Y-zeolite. The coating is calcined to 500° C. for 4 hours. The calcined washcoat weight of barium zirconium phosphate is targeted to 1.0 g/in$^3$ or less.

The coatings made and tested are barium zirconium phosphate mixed with barium Y zeolite. All catalysts had conversions of at least 70% $NO_x$ to $N_2$.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

We claim:

1. A $NO_x$ catalyst comprising:
   a $NO_x$ occluding catalyst material; and
   a protective catalyst support including a metal-zirconium phosphate, coated on the $NO_x$ occluding catalyst material.

2. The $NO_x$ catalyst of claim 1 wherein the metal-zirconium phosphate is selected from the group consisting of barium zirconium phosphate, cesium zirconium phosphate, silver zirconium phosphate, and mixtures thereof.

3. The $NO_x$ catalyst of claim 2 wherein the metal-zirconium phosphate is barium zirconium phosphate.

4. The $NO_x$ catalyst of claim 3 wherein the barium zirconium phosphate includes about 13 to 24 weight percent barium.

5. The $NO_x$ catalyst of claim 2 wherein the protective catalyst support further comprises an additive component selected from the group consisting of titanium, aluminum, silver, yttrium, and mixtures thereof.

6. The $NO_x$ catalyst of claim 5 wherein the protective catalyst support further comprises an active metal component selected from the group consisting of nickel, copper, cobalt, and mixtures thereof.

7. The $NO_x$ catalyst of claim 6 wherein the protective catalyst support includes about 1 to 3 of the active metal component to about 1 to 3 moles of zirconium.

8. The $NO_x$ catalyst of claim 5 wherein the protective catalyst support includes about 1 to 3 moles of the additive component to about 1 to 3 moles of zirconium.

9. The $NO_x$ catalyst of claim 2 wherein the protective catalyst support further comprises an active metal component selected from the group consisting of nickel, copper, cobalt, and mixture thereof.

10. The $NO_x$ catalyst of claim 1 wherein the metal-zirconium phosphate has pore sizes ranging from about 10 to about 30 microns.

11. The $NO_x$ catalyst of claim 1 wherein the $NO_x$ occluding catalyst material is selected from the group consisting of zeolites, aluminas, and mixture thereof.

12. The $NO_x$ catalyst of claim 11 wherein the $NO_x$ occluding catalyst material is selected from the group consisting of barium Y zeolites, barium aluminas, and mixture thereof.

13. The $NO_x$ catalyst of claim 11, wherein said $NO_x$ occluding catalyst material comprises titanium doped zeolite.

14. A $NO_x$ catalyst comprising a monolith having about 3.0 $g/in^3$ of a barium Y zeolite coated with about 1.0 $g/in^3$ of a barium zirconium phosphate.

15. A $NO_x$ catalyst comprising about 3.0 $g/in^3$ of a barium Y zeolite coated with about 1.0 $g/in^3$ of a barium zirconium phosphate.

* * * * *